United States Patent
Nakano et al.

(10) Patent No.: US 10,037,485 B2
(45) Date of Patent: Jul. 31, 2018

(54) FLEXIBLE IC TAG

(71) Applicant: NOK CORPORATION, Tokyo (JP)

(72) Inventors: Tomoko Nakano, Fujisawa (JP);
Naohiro Fujisawa, Fujisawa (JP);
Keiichi Miyajima, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/102,666

(22) PCT Filed: Dec. 17, 2014

(86) PCT No.: PCT/JP2014/083341
§ 371 (c)(1),
(2) Date: Jun. 8, 2016

(87) PCT Pub. No.: WO2015/098633
PCT Pub. Date: Jul. 2, 2015

(65) Prior Publication Data
US 2017/0032233 A1 Feb. 2, 2017

(30) Foreign Application Priority Data
Dec. 26, 2013 (JP) .................................. 2013-268953

(51) Int. Cl.
*G06K 19/06* (2006.01)
*G06K 19/077* (2006.01)

(52) U.S. Cl.
CPC . *G06K 19/06196* (2013.01); *G06K 19/07749* (2013.01); *G06K 19/07794* (2013.01)

(58) Field of Classification Search
CPC ................................................ G06K 19/06196
(Continued)

(56) References Cited

U.S. PATENT DOCUMENTS

2008/0275327 A1* 11/2008 Faarbaek ............. A61B 5/0002
600/382
2009/0079574 A1 3/2009 Oroku et al.
(Continued)

FOREIGN PATENT DOCUMENTS

JP 2009-075687 A 4/2009
JP 2009-134515 A 6/2009
(Continued)

OTHER PUBLICATIONS

Korean Office Action dated Mar. 29, 2017.
(Continued)

*Primary Examiner* — Toan Ly
(74) *Attorney, Agent, or Firm* — Harness, Dickey & Pierce, P.L.C.

(57) ABSTRACT

Provided is an IC tag favorably applicable even to linen products. An IC tag 100 using a magnetic field type tag unit 110 in which an IC chip and a coil antenna to be electrically connected to the IC chip are embedded inside a hard resin material. The IC tag includes: a flexible film made of resin (a base film 121, a cover film 123, and a protective film 124); and an auxiliary antenna 122 formed on the film, wherein the magnetic field type tag unit 110 is fixed to the film by an adhesive 130 with elasticity at a position that enables communication by electromagnetic coupling between the coil antenna and the auxiliary antenna 122.

3 Claims, 4 Drawing Sheets

(58) Field of Classification Search
USPC .......................................................... 235/493
See application file for complete search history.

(56) References Cited

U.S. PATENT DOCUMENTS

| | | |
|---|---|---|
| 2009/0224056 A1 | 9/2009 | Kwon |
| 2010/0105486 A1* | 4/2010 | Shigeta .................. A44C 21/00 463/47 |
| 2012/0038445 A1* | 2/2012 | Finn ................. G06K 19/07794 336/105 |
| 2013/0277435 A1* | 10/2013 | Bielmann ........ G06K 19/07749 235/492 |
| 2014/0104133 A1* | 4/2014 | Finn ................. G06K 19/07769 343/866 |
| 2015/0097040 A1* | 4/2015 | Rampetzreiter . G06K 19/07779 235/492 |
| 2015/0122891 A1 | 5/2015 | Nakano et al. |

FOREIGN PATENT DOCUMENTS

| | | |
|---|---|---|
| JP | 2012-018629 A | 1/2012 |
| JP | 2012-060372 A | 3/2012 |
| JP | 2013-080324 A | 5/2013 |
| JP | 2013-171428 A | 9/2013 |
| JP | 2013-171430 A | 9/2013 |
| JP | 2013-222409 A | 10/2013 |
| KR | 10-0793524 B1 | 1/2008 |
| WO | 2012-126063 A1 | 9/2012 |

OTHER PUBLICATIONS

Japanese Office Action dated Sep. 12, 2017 with English translation (corresponding to JP2013-268953).
Japanese Office Action dated Jun. 6, 2017 with English translation.

* cited by examiner

FLEXIBLE IC TAG

CROSS-REFERENCE TO RELATED APPLICATIONS

This application is a National Stage of International Application No. PCT/JP2014/083341, filed Dec. 17, 2014 (now WO 2015/098633A1), which claims priority to Japanese Application No. 2013-268953, filed Dec. 26, 2013. The entire disclosures of each of the above applications are incorporated herein by reference.

FIELD

The present disclosure relates to an IC tag employing a magnetic field type tag unit.

BACKGROUND

Conventionally, RFID technology is widely used to perform product management. When an IC tag is attached to a linen product such as a uniform or a sheet used in a hotel, the IC tag is to be subjected to cleaning together with the linen product. Therefore, the IC tag attached to the product must be resistant to external force and resistant to solutions used during cleaning. In consideration thereof, as an IC tag to be attached to a linen product, an IC tag provided with a covered portion made of a rubber material so as to cover an IC tag main body is known (refer to Patent Literature 1).

However, when cleaning is performed, a problem arises in that the IC tag is damaged due to pressure in a spinning process using a pressing machine which is referred to as compression and which is performed after washing by water. A result of an investigation into the causes of this problem will now be described with reference to FIG. 7. FIG. 7 is a schematic cross-sectional view of an IC tag according to a conventional example.

An IC tag 500 according to the conventional example includes an IC chip 510, a flexible printed board (hereinafter, referred to as an FPC 520), and a covered portion 550 which covers a surface of the FPC 520. In the FPC 520, a copper foil 522 to function as an antenna is formed between a base film 521 and a cover film 523. The IC tag 500 according to the conventional example is an electric field type IC tag which requires the IC chip 510 and the copper foil 522 to be electrically connected to each other. To this end, an opening is formed on the cover film 523 and the IC chip 510 is arranged in the opening to fix the IC chip 510 and the copper foil 522 to each other with a solder 530. In addition, in order to prevent detachment of the solder 530 when stress concentrates in a vicinity of the IC chip 510, an underfill 540 obtained by filling epoxy resin or the like is provided.

It was found that damage to the IC tag 500 occurs when the vicinity of the IC chip 510 is bent during compression due to an inability of the vicinity of the IC chip 510 to conform to deformation because of its hardness, and stress concentration causes the copper foil 522 to break.

In addition to electric field type IC tags, there are magnetic field type IC tags. Regarding magnetic field type IC tags, a technique is known in which an IC chip and a coil antenna are unitized by embedding the IC chip and the coil antenna inside a hard resin material such as epoxy. With this technique, since the IC chip and the coil antenna are embedded inside a hard resin material, problems such as disconnection between the IC chip and the coil antenna do not occur. In addition, such unitized IC tags (hereinafter, referred to as magnetic field type tag units) are realized in small sizes and can conceivably be attached to linen products. However, since such a small magnetic field type tag unit has a short communication distance when used on a stand-alone basis, an auxiliary antenna must be provided for practical use (refer to Patent Literature 2). In this case, accuracy of a positional relationship between the magnetic field type tag unit and the auxiliary antenna must be increased.

However, since an IC tag to be attached to a linen product comes into contact with human skin, the IC tag is generally required to be flexible. In addition, as described earlier, the IC tag is subjected to a large force during a spinning process using a pressing machine which is referred to as compression when performing cleaning. Accordingly, a large force may be applied to the IC tag in a state where the IC tag is bent. There are no IC tags capable of increasing the accuracy of a positional relationship between a magnetic field type tag unit and an auxiliary antenna under such conditions.

CITATION LIST

Patent Literature

Patent Literature 1: Japanese Patent Application Laid-open No. 2012-18629
Patent Literature 2: Japanese Patent Application Laid-open No. 2013-80324

SUMMARY

Technical Problem

An object of the present disclosure is to provide an IC tag that enables a magnetic field type tag unit and an auxiliary antenna to be accurately positioned even when attached to a linen product.

Solution to Problem

In order to solve the problem described above, the present disclosure adopts the following means.

Specifically, an IC tag according to the present disclosure is an IC tag employing a magnetic field type tag unit in which an IC chip and a coil antenna to be electrically connected to the IC chip are embedded inside a hard resin material, the IC tag including: a flexible film made of resin; and an auxiliary antenna formed on the film, wherein the magnetic field type tag unit is fixed to the film by an adhesive with elasticity at a position that enables communication by electromagnetic coupling between the coil antenna and the auxiliary antenna.

With the IC tag according to the present disclosure, since the magnetic field type tag unit need only be fixed by an adhesive to a film on which the auxiliary antenna is formed, the magnetic field type tag unit and the auxiliary antenna can be accurately positioned. In addition, in the case of the IC tag according to the present disclosure, the magnetic field type tag unit is fixed to the film by an adhesive with elasticity. Therefore, even when an external force is applied, an impact can be absorbed to prevent the magnetic field type tag unit from detaching from the film. Specifically, even if the film is flexible, when the adhesive used to fix the magnetic field type tag unit to the film is a resin-based adhesive such as an epoxy-based adhesive, the adhesive hardens after solidification and promotes concentration of stress at an interface between the adhesive and the film. In other words, a stress concentration site is created inside the IC tag. Accordingly, the magnetic field type tag unit is more readily detached from the film with the interface as a starting point of detachment. In contrast, in the present disclosure, by adopting an adhesive with elasticity, impact can be absorbed at the adhesive since the adhesive retains elasticity even after solidification. As a result, even if the IC tag bends and deforms, the IC tag can conform to the deformation. In other words, the stress can be alleviated inside the IC tag to prevent the magnetic field type tag unit from detaching from the film.

Advantageous Effects of Invention

As described above, according to the present disclosure, a magnetic field type tag unit and an auxiliary antenna can be accurately positioned even with an IC tag to be attached to a linen product.

DRAWINGS

DETAILED DESCRIPTION

Hereinafter, modes for carrying out the present disclosure will be exemplarily described in detail based on examples thereof with reference to the drawings. However, the dimensions, materials, shapes, relative arrangements and so on of constituent parts described in the examples are not intended to limit the scope of the present disclosure to these alone in particular unless specifically described.

Example 1

Figure 1:
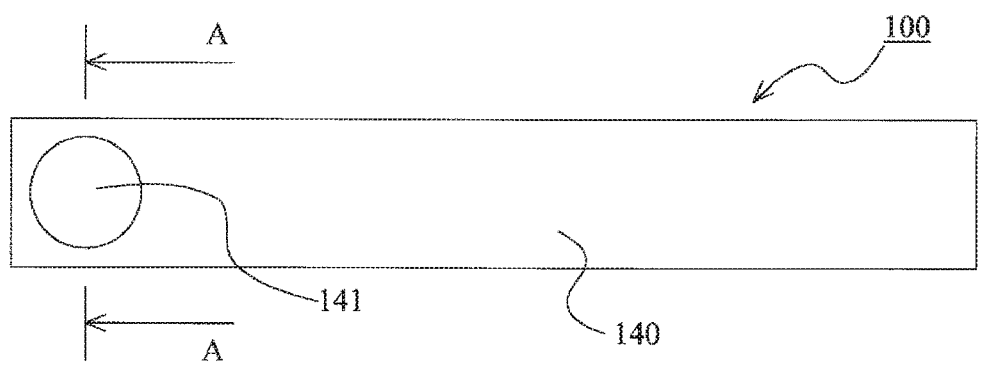
FIG. 1 is a plan view of an IC tag according to an Example 1 of the present disclosure.
Figure 2:
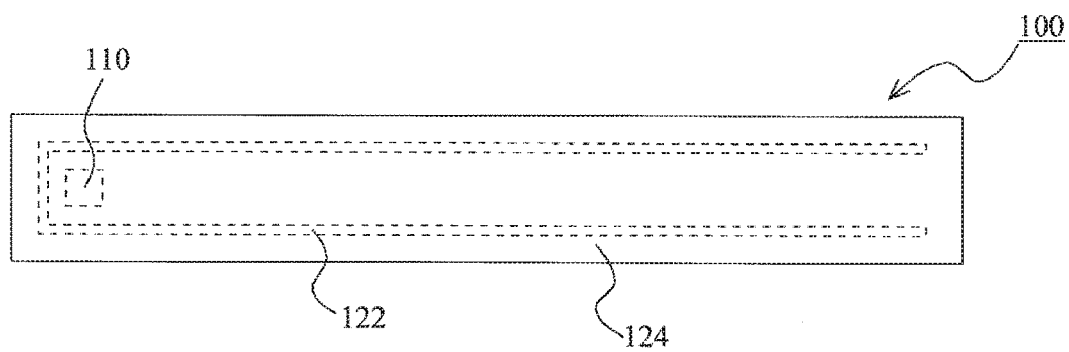
FIG. 2 is a bottom view of the IC tag according to the Example 1 of the present disclosure.
Figure 3:
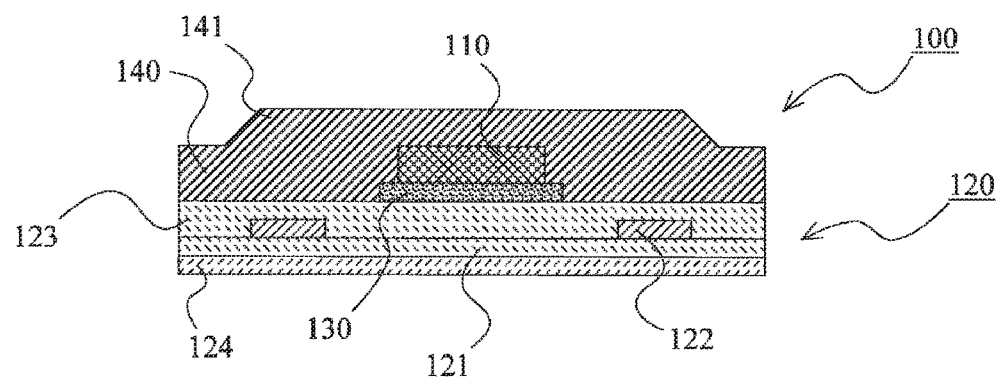
FIG. 3 is a schematic cross-sectional view of the IC tag according to the Example 1 of the present disclosure.
Figure 4:
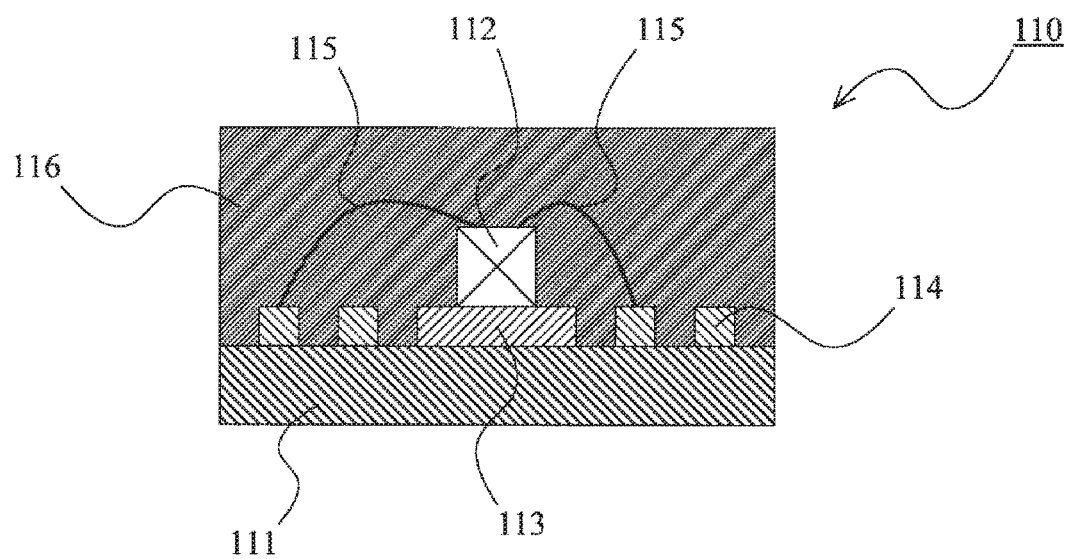
FIG. 4 is a schematic cross-sectional view of a magnetic field type tag unit.

An IC tag according to an Example 1 of the present disclosure will be described with reference to FIGS. 1 to 4. FIG. 1 is a plan view of an IC tag according to an Example 1 of the present disclosure. FIG. 2 is a bottom view of the IC tag according to the Example 1 of the present disclosure. Moreover, in FIG. 2, a part of the components inside the IC tag is depicted by a dotted line. FIG. 3 is a schematic cross-sectional view of the IC tag according to the Example 1 of the present disclosure. Moreover, FIG. 3 is a cross-sectional view taken along AA in FIG. 1. FIG. 4 is a schematic cross-sectional view of a magnetic field type tag unit. The IC tag according to the present Example is used in RFID and, in particular, favorably used as an IC tag to be attached to a linen product.
<IC Tag>

An overall configuration of the IC tag will be described with particular reference to FIGS. 1 to 3. An IC tag 100 includes a magnetic field type tag unit 110, a flexible printed circuit board (hereinafter, referred to as an FPC 120), and a covered portion 140 which covers a surface of the FPC 120.

The FPC 120 includes a base film 121, an auxiliary antenna 122 constituted by a metal foil (for example, a copper foil) formed on the base film 121, and a cover film 123 formed on surfaces of the base film 121 and the auxiliary antenna 122. The base film 121 and the cover film 123 are both constituted by a flexible film made of resin. More specifically, PI (polyimide resin) with superior adhesion to rubber is used as the material of these films. In addition, a rear surface side (an opposite side to the cover film 123) of the base film 121 is covered by a protective film 124. The protective film 124 is also a flexible film made of resin. As a material of the protective film 124, PEN (polyethylene naphthalate) with superior alkaline resistance is used in order to provide resistance to weak alkaline detergents.

The magnetic field type tag unit 110 is fixed using an adhesive 130 with elasticity to the FPC 120 configured as described above. Moreover, a rubber glue can be favorably used as the adhesive 130. As the adhesive 130, an adhesive with superior adhesion with respect to the magnetic field type tag unit 110 and the cover film 123 is desirably used. In addition, the magnetic field type tag unit 110 is fixed to the FPC 120 at a position that enables communication by electromagnetic coupling between a coil antenna (to be described later) and the auxiliary antenna 122.

Together with a surface of the FPC 120, the magnetic field type tag unit 110 is covered by the covered portion 140 which is constituted by an elastic body. Moreover, the covered portion 140 can be provided by insert molding using a component obtained by fixing the magnetic field type tag unit 110 on the FPC 120 as an insert component. In addition, as a material of the covered portion 140, silicone rubber, fluororubber, nitrile rubber, butyl rubber, EPDM, adhesive rubber, and the like can be favorably used. As described above, since PI with superior adhesion with respect to rubber is used as the material of the cover film 123, adhesion between the cover film 123 and the covered portion 140 can be increased. Furthermore, the covered portion 140 is provided with a protruded portion 141 with a circular planar shape in a vicinity of the magnetic field type tag unit 110. Providing the protruded portion 141 enables strength of the vicinity of the magnetic field type tag unit 110 to be increased compared to a periphery thereof and prevents bending of the IC tag 100 in the vicinity of the magnetic field type tag unit 110.
<Magnetic Field Type Tag Unit>

A configuration of the magnetic field type tag unit will be described with reference to FIG. 4. Moreover, the magnetic field type tag unit (also referred to as a tag package or a packaged tag) concerns known technology as disclosed in, for example, Patent Literature 2 described above. Therefore, only a brief description will be given below.

In the magnetic field type tag unit 110, an IC chip 112 is fixed on a die pad 113 formed on a substrate 111. In addition, a coil antenna 114 is provided so as to enclose a periphery of the IC chip 112. The IC chip 112 and the coil antenna 114 are electrically connected to each other by a wire 115. Furthermore, the IC chip 112, the die pad 113, the coil antenna 114, and the wire 115 are embedded inside a hard resin material 116 such as epoxy.

With the magnetic field type tag unit 110 configured as described above, since the various members are embedded inside the hard resin material 116, problems such as disconnection between the IC chip 112 and the coil antenna 114 do not occur. Another advantage is that downsizing can be achieved. For example, the magnetic field type tag unit 110 is generally an approximate rectangular parallelepiped in which longitudinal and transversal lengths can be set to 1.5 mm or more and 8 mm or less and thickness can be set to around 0.5 mm or more and 1.5 mm or less. Moreover, products that are actually available include those whose "longitudinal length×transversal length×thickness" are "2.5 mm×2.5 mm×1 mm", "3.2 mm×1.6 mm×0.55 mm", and "7 mm×7 mm×1.4 mm". As the IC tag 100 according to the present Example, any of these products can be favorably used.

However, since the small-sized magnetic field type tag unit 110 configured as described above has a short communication distance of several millimeters, the magnetic field type tag unit 110 cannot be used as-is in practical applications. In consideration thereof, in the IC tag 100 according to the present Example, as described above, a configuration is adopted in which the magnetic field type tag unit 110 is provided on the FPC 120 which includes the auxiliary antenna 122. As a result, the communication distance can be set to around 30 cm to 1 m.

Moreover, in order to have the auxiliary antenna 122 fulfill its function, an arrangement relationship between the coil antenna 114 and the auxiliary antenna 122 must be adjusted so as to enable communication by electromagnetic coupling between the coil antenna 114 and the auxiliary antenna 122. More specifically, a distance between the magnetic field type tag unit 110 and the auxiliary antenna 122 must be reduced while ensuring that the magnetic field type tag unit 110 and the auxiliary antenna 122 do not overlap with each other when viewed in a direction of a magnetic field formed by the coil antenna 114. In other words, the magnetic field type tag unit 110 and the auxiliary antenna 122 must be adjusted so as not to overlap with each other in FIG. 2.

<Advantages of IC Tag According to Present Example>

With the IC tag 100 according to the present Example, since the magnetic field type tag unit 110 need only be fixed by the adhesive 130 to the FPC 120 on which the auxiliary antenna 122 is formed, the magnetic field type tag unit 110 and the auxiliary antenna 122 can be accurately positioned. In addition, using the magnetic field type tag unit 110 omits the need to electrically connect an IC chip and an antenna (a copper foil or the like) to each other using a solder or the like on a film (FPC) as is the case of an electric field type IC tag. Therefore, since there is no need to form an opening on a cover film or provide an underfill, manufacturing is facilitated.

In addition, since the FPC 120 is constituted by resin films which are all flexible and the covered portion 140 is constituted by an elastic body, the IC tag 100 is flexible. Furthermore, in the present Example, the magnetic field type tag unit 110 is fixed to the FPC 120 by the adhesive 130 with elasticity. Therefore, even when an external force is applied when molding the covered portion 140 or during a compression process of cleaning, an impact can be absorbed to prevent the magnetic field type tag unit 110 from detaching from the FPC 120. Specifically, even if the FPC and the covered portion which constitute the IC tag are flexible, when the adhesive used to fix the magnetic field type tag unit to the FPC is a resin-based adhesive such as an epoxy-based adhesive, the adhesive hardens after solidification and promotes the concentration of stress at an interface between the adhesive and the FPC. In other words, a stress concentration site is created inside the IC tag. Accordingly, the magnetic field type tag unit is more readily detached from the FPC with the interface as a starting point of detachment. In contrast, with the IC tag 100 according to the present Example, by adopting the adhesive 130 with elasticity, impact can be absorbed at an adhered portion since the adhesive 130 retains elasticity even after solidification. As a result, even if the IC tag 100 bends and deforms, the IC tag 100 can conform to the deformation. In other words, the stress can be alleviated inside the IC tag 100 to prevent the magnetic field type tag unit 110 from detaching from the FPC 120.

In addition, since the IC tag 100 according to the present Example is provided with the auxiliary antenna 122, communication distance can be increased. Moreover, with the IC tag 100 according to the present Example, even when a disconnection of the auxiliary antenna 122 occurs and the auxiliary antenna 122 stops functioning, information can be retrieved from the magnetic field type tag unit 110, albeit over a shorter communication distance.

Example 2

Figure 5:
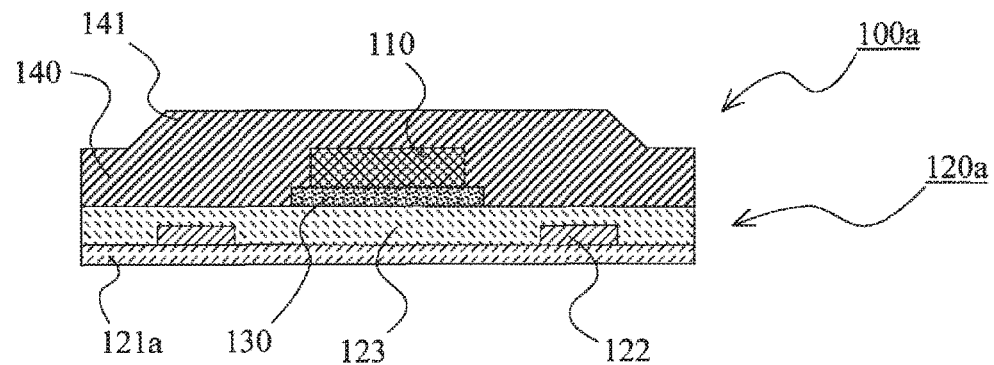
FIG. 5 is a schematic cross-sectional view of an IC tag according to an Example 2 of the present disclosure.

FIG. 5 shows an Example 2 of the present disclosure. In the Example 1 described above, a configuration has been shown in which a protective film is provided on a rear surface side of a base film. By comparison, in the present Example, a configuration will be described in which a base film itself is equipped with a function of a protective film. Since other components and effects are the same as those of the Example 1, the same components will be denoted by the same reference characters and a description thereof will be omitted as appropriate. FIG. 5 is a schematic cross-sectional view of an IC tag according to the Example 2 of the present disclosure. Moreover, a plan view and a bottom view of the IC tag according to the present Example are respectively similar to FIGS. 1 and 2 described in the Example 1 while FIG. 5 corresponds to a cross-section taken along AA in FIG. 1.

An IC tag 100a according to the present Example is provided with a magnetic field type tag unit 110, an FPC 120a, and a covered portion 140 that covers a surface of the FPC 120a in a similar manner to the Example 1. The present Example only differs from the Example 1 in a configuration of the FPC 120a. As such, only the configuration of the FPC 120a will be described below.

The FPC 120a according to the present Example includes a base film 121a, an auxiliary antenna 122 constituted by a metal foil (for example, a copper foil) formed on the base film 121a, and a cover film 123 formed on surfaces of the base film 121a and the auxiliary antenna 122. The base film 121a and the cover film 123 are both constituted by a flexible film made of resin. In addition, in the present Example, while PI with superior adhesion with respect to rubber is used as a material of the cover film 123 in a similar manner to the Example 1, PEN with superior alkaline resistance is used as a material of the base film 121a to provide resistance to weak alkaline detergents. In other words, the function of the protective film 124 according to the Example 1 is imparted to the base film 121a.

Even with the IC tag 100a according to the present Example configured as described above, similar operational effects to the Example 1 can be produced. In addition, with the present Example, since the protective film used in the Example 1 is no longer necessary, the number of parts can be reduced.

Example 3

Figure 6:
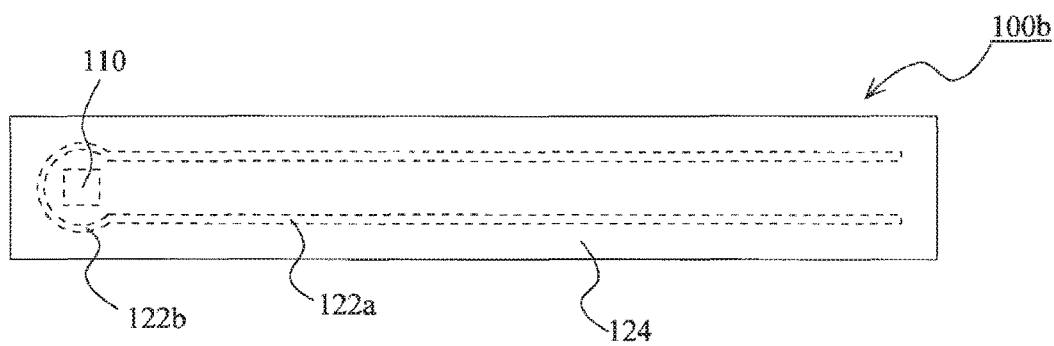
FIG. 6 is a bottom view of an IC tag according to an Example 3 of the present disclosure.
Figure 7:
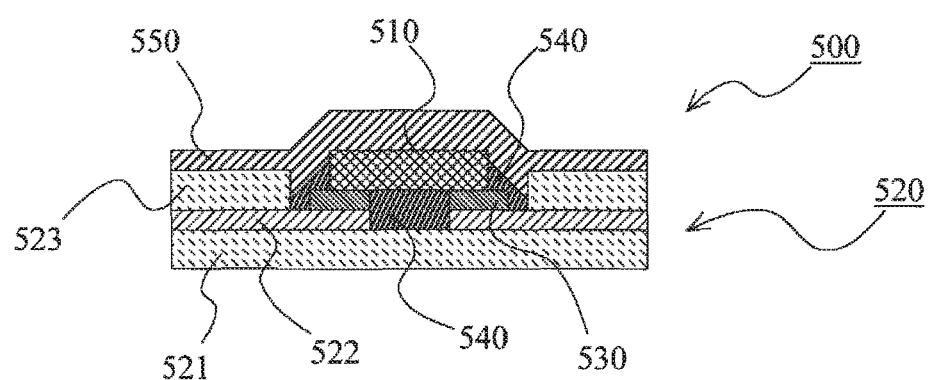
FIG. 7 is a schematic cross-sectional view of an IC tag according to a conventional example.

FIG. 6 shows an Example 3 of the present disclosure. In the present Example, a configuration will be shown in which a shape of the auxiliary antenna according to the Example 1 is changed. Since other components and effects are the same as those of the Example 1, the same components will be denoted by the same reference characters and a description thereof will be omitted as appropriate. FIG. 6 is a bottom view of an IC tag according to the Example 3 of the present disclosure. Moreover, a plan view and a schematic cross-sectional view of the IC tag according to the present Example are respectively similar to FIGS. 1 and 3 described in the Example 1.

The present Example only differs from the Example 1 in a shape of the auxiliary antenna, and other components are the same. As such, only the auxiliary antenna will be described below. The auxiliary antenna 122 according to the Example 1 has a shape bent at a right angle in a vicinity of the magnetic field type tag unit 110 so as to conform to a periphery thereof (refer to FIG. 2). In contrast, the auxiliary antenna 122a according to the present Example has an arc shape in a vicinity of the magnetic field type tag unit 110 so as to enclose a periphery thereof (refer to an arc-shaped portion 122b in the diagram).

In the Example 1, there is a fear that stress may concentrate and cause a disconnection at a portion bent at a right angle in the auxiliary antenna 122. In contrast, the present Example provides an advantage of alleviating stress concentration by eliminating the portion bent at a right angle of the auxiliary antenna 122a. Furthermore, in order to enable communication by electromagnetic coupling between the coil antenna 114 and the auxiliary antennas 122 and 122a, accuracy of positioning of the magnetic field type tag unit 110 with respect to the auxiliary antennas 122 and 122a must be increased. Even when the magnetic field type tag unit 110 is fixed in a state of being displaced with respect to the FPC 120 in a direction of rotation as seen from above, the Example 3 can reduce an error in the distance between the coil antenna 114 and the auxiliary antenna 122a as compared to the Example 1.

Moreover, the auxiliary antenna 122a according to the present Example can also be applied to the IC tag 100a according to the Example 2.

REFERENCE SIGNS LIST

100, 100a tag
110 magnetic field type tag unit
111 substrate
112 IC chip
113 die pad
114 coil antenna
115 wire
116 resin material
121, 121a base film
122, 122a auxiliary antenna
122b arc-shaped portion
123 cover film
124 protective film
130 adhesive
140 covered portion
141 protruded portion

The invention claimed is:

1. An IC tag, comprising:
   a magnetic field type tag unit in which an IC chip and a coil antenna to be electrically connected to the IC chip are embedded inside a hard resin material;
   a flexible film made of resin;
   an auxiliary antenna formed on the film;
   an adhesive with elasticity fixes the magnetic field type tag unit to the flexible film at a position that enables communication by electromagnetic coupling between the coil antenna and the auxiliary antenna; and
   a covered portion which is provided by insert molding using a component obtained by fixing the magnetic field type tag unit on the film by the adhesive as an insert component and which covers a surface of the magnetic field type tag unit and the film.

2. The IC tag according to claim 1, wherein a material of the film is polyimide resin.

3. The IC tag according to claim 1, wherein the covering portion is provided with a protruded portion with a circular planar shape at a portion where the magnetic field type tag unit is provided.

* * * * *